United States Patent [19]

Terry et al.

[11] Patent Number: 4,867,383

[45] Date of Patent: Sep. 19, 1989

[54] METHOD AND SYSTEM FOR PROCESSING WASTEPAPER

[75] Inventors: Byron R. Terry, Neenah, Wis.; Frank G. Hamilton, Memphis, Tenn.

[73] Assignee: Kimberly-Clark Corporation, Neenah, Wis.

[21] Appl. No.: 700,076

[22] Filed: Feb. 11, 1985

[51] Int. Cl.⁴ ............................................. B02C 19/00
[52] U.S. Cl. ........................................ 241/24; 162/4; 241/29; 241/73; 241/80; 241/152 A
[58] Field of Search ................. 162/55, 4; 241/80, 97, 241/60, 61, 73, 186 R, 189 R, 56, 28, 19, 29, 20, 21, 152 A, 24, 27

[56] References Cited

FOREIGN PATENT DOCUMENTS 2087266  3/1982  United Kingdom .................. 241/24

Primary Examiner—Mark Rosenbaum
Attorney, Agent, or Firm—Gregory E. Croft

[57] ABSTRACT

A method of preparing wastepaper for fiberization comprising: (a) shredding the wastepaper in a screened shredding device, through which the wastepaper is drawn by a fan; (b) passing the resulting shredded-and-screened wastepaper through the fan, wherein wadded-up pieces of wastepaper which passed through said screen are opened up; and (c) screening out opened-up pieces of wastepaper.

10 Claims, 3 Drawing Sheets

METHOD AND SYSTEM FOR PROCESSING WASTEPAPER

BACKGROUND OF THE INVENTION

Copending application Ser. No. 554,174, filed Nov. 22, 1983, now abandoned herein incorporated by reference in its entirety, teaches a method for deinking secondary fiber sources, such as wastepaper, by fiberizing the secondary fiber source in a substantially dry state to produce substantially discrete fibers and ink-containing fines and separating the fibers from the fines.

In designing a commercial dry deinking process for processing large volumes of wastepaper as described in the above-mentioned application, it has been found advantageous to provide a consistent and uniform feed rate of shredded wastepaper to the fiberizers. To accomplish this, one might suggest feeding the shredded wastepaper to the fiberizers from a storage/metering bin (hereinafter more fully described) which provides a large material residence time to overcome any upstream fluctuations in material flow rates and at the same time provide a controlled, finely-tuned feed rate to the fiberizers. However, it has been found that in order to provide sufficient metering of the shredded wastepaper to the fiberizers, the outlets of the storage/metering bin must be relatively small. It has also been discovered that if too many oversized pieces of shredded wastepaper enter the storage/metering bin which do not pass through the outlets, the oversized pieces simply recycle within the storage/metering bin and quickly accumulate, causing the storage/metering bin to fill and overflow.

Since wastepaper generally is provided in baled form containing a wide range of sizes and shapes of wastepaper and contaminants, it is necessary to first shred the wastepaper into pieces no larger than a size which is suitable for subsequent processing. Because of the size limitations of the outlets of the storage/metering bin described above, it is therefore necessary to control the size of the shredded wastepaper leaving the shredding device. A screened shredding device, such as a screened hammermill, having screen openings of a size sufficiently small to be compatible with the size of the storage/metering bin outlets would seemingly provide control of the size of the shredded wastepaper sufficient to satisfy the storage/metering bin size limitation. Large pieces are retained within the shredding device until they are reduced to a size small enough to pass through the screen and hence, by design, also small enough to pass through the outlets of the storage/metering bin. Such a shredding device could be, as is common practice, coupled with a shredder fan, positioned just downstream of the shredder screen, which would serve to pull air and entrained materials through the shredding device and screen and propel or airvey the shredded material downstream. The thus shredded and screened wastepaper could then be deposited into the storage/metering bin(s).

However, it has also been discovered that in some instances screened shredders, such as screened hammermills, allow wadded-up wastepaper to pass through their screens if the wadded-up wastepaper has a sufficiently small 2-dimensional size. The wadded-up wastepaper, such as is commonly found in office wastebaskets, is initially present in the baled feed material and, if wadded-up tightly enough, can pass through the shredder virtually unaltered. Surprisingly, these wadded-up materials are thereafter "opened-up" by the blade action of the shredder fan which, as previously mentioned, is used to draw the feed material through the shredders and propel the shredded material downstream. Some of these opened-up pieces of wastepaper are larger (2-dimensionally) than the openings in the shredder screen through which they passed in a wadded form and are also too large to exit the storage/metering bin. This situation can cause operational problems with the storage/metering bin as previously mentioned.

The foregoing discoveries led to the solution of screening the shredded material a second time, but at some point in the process after the shredder fan and prior to the storage/metering bins to remove any opened-up pieces of wastepaper which would have been too large to pass through the openings in the shredder screen or the outlets of the storage/metering bin(s). The need for an additional screening step after the shredder screen is unexpected since the shredder screen could be expected to be sufficient. However, due to the peculiar nature of wastepaper as a feedstock, most notably its flexibility, low density, and wide variety of shapes and sizes, which allows wadded-up wastepaper to open up or "expand" to a larger 2-dimensional size, a second screening is necessary. This problem is not present when processing other materials, such as wood chips, for which storage/metering bins are designed. Hence because of the novelty of the dry deinking process, it has become necessary to invent ways to handle wastepaper in preparation for dry deinking

SUMMARY OF THE INVENTION

In one aspect, the invention resides in a method of preparing wastepaper for fiberization comprising: (a) shredding the wastepaper in a screened shredding device, through which the wastepaper is drawn by a fan; (b) passing the resulting shredded-and-screened wastepaper through the fan, wherein wadded-up pieces of wastepaper which passed through said screen are opened up; and (c) screening out opened-up pieces of wastepaper. Suitable screened shredding devices include screened hammermills, which are suitably coupled with a shredder fan which serves to draw the wastepaper through the screened hammermill and open up any wadded-up pieces of wastepaper. Screening out the opened-up pieces of wastepaper is suitably accomplished by using a disc-type screen which is especially adapted for handling low density materials such as wastepaper. However, other screening devices, such as vibrating screens, can also be used. Preferably, the screened-out pieces of wastepaper are recycled back to the shredding operation.

In another aspect, the invention resides in a system for deinking wastepaper by dry fiberization of the wastepaper comprising:

(a) means for shredding the wastepaper into pieces suitable for fiberization;

(b) means for drawing the wastepaper through the shredding means, said means opening up wadded pieces of wastepaper and propelling the wastepaper downstream;

(c) means for screening the wastepaper propelled downstream to remove the opened-up pieces of wastepaper and to retain the suitably-sized pieces of wastepaper;

(d) means for metering suitably-sized pieces of wastepaper to a fiberization means;

(e) means for fiberizing the metered wastepaper into substantially discrete fibers and ink-containing fines; and (f) means for separating the fines from the fibers.

In a further aspect, the invention resides in an improved process for deinking wastepaper wherein a wastepaper feed material is shredded to a size suitable for fiberization and fiberized substantially dry to form substantially discrete fibers and ink-containing fines which are thereafter separated, the improvement comprising: (a) shredding the wastepaper feed material in a screened shredding device, through which the wastepaper is drawn by a fan; (b) screening the shredded material after it passes through the fan to remove wadded-up pieces of wastepaper which have been opened up by the fan; (c) depositing the screened wastepaper into at least one storage/metering bin; and (d) metering the screened wastepaper to one or more fiberizers.

In a still further aspect, the invention resides in a system for preparing wastepaper for fiberization comprising: (a) a screened hammermill for shredding the wastepaper into pieces suitable for fiberization; (b) a shredder fan for drawing the wastepaper through the screened hammermill and propelling the resulting shredded pieces of wastepaper downstream; (c) a disc screen for removing opened-up pieces of wastepaper propelled downstream by the shredder fan; and (d) a storage/metering bin for receiving and metering pieces of wastepaper passing through the disc screen.

DETAILED DESCRIPTION OF THE INVENTION

Figure 1:
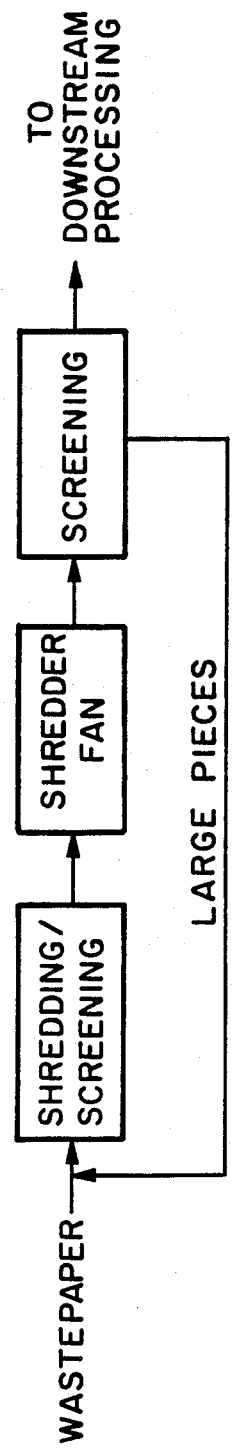
FIG. 1 is a block flow diagram of the process of this invention.

FIG. 1 illustrates the basic process steps of this invention. A wastepaper feed material, i.e. wastepaper which is substantially free of metals or other materials which might damage downstream apparatus, is shredded to a size sufficiently small to permit passage through downstream equipment by any suitable means, such as by one or more hammermills, the last of which contains a screen. It will be appreciated that the size of the shredded pieces is only limited by the sizing of the inlets and outlets of the particular apparatus used throughout the remainder of the process and is not a limitation of the process of this invention. In the preferred embodiment of the process, the limiting size is the outlets of the storage/metering bins(s) being used. Hence the openings of the shredder screen are designed to only allow pieces of wastepaper to pass through which are also of a size which will pass through the storage/metering bins(s) located downstream. The shredder fan which pulls material through the shredder screen provides an airstream which carries the shredded material downstream. As previously mentioned, it has been discovered that the shredder fan also tends to open up any wadded-up or crumpled pieces of waste paper which pass through the shredder screen, hence "creating" oversized pieces.

Therefore, after leaving the shredder fan, the shredded-and screened wastepaper is screened again to remove those oversized pieces which were opened up by the shredder fan. The oversized opened-up pieces are recycled back to the shredder(s) as shown. A particularly suitable screening device to carry out this function is a disc screen because the low bulk density of shredded paper is particularly disadvantageous for other screening devices. However, alternative screening devices can also be used, such as vibratory, oscillating, or orbital shaker screens.

Figure 3:
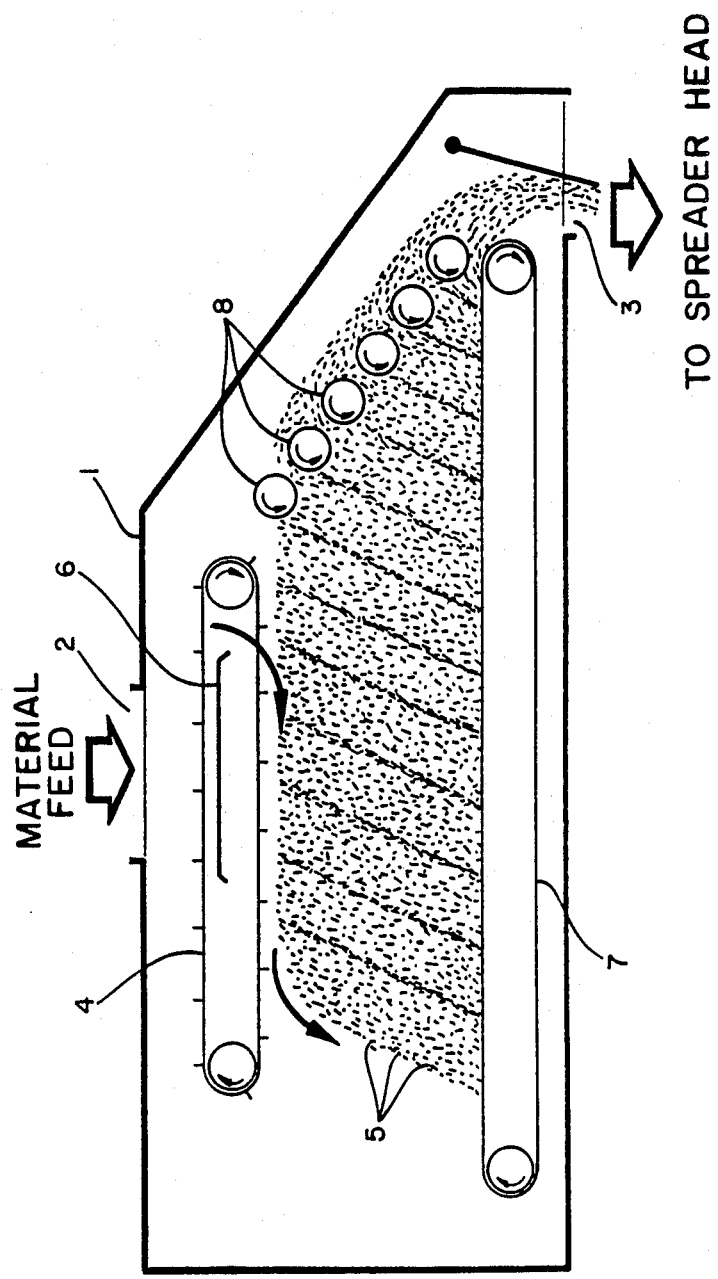
FIG. 3 is a schematic diagram of a storage/metering bin suitable for practicing the process of this invention as applied to a dry deinking feed preparation process.

The acceptably-sized pieces of wastepaper are then directed to a storage/metering bin, which is preferably of the type illustrated in FIG. 3. This apparatus provides a large reservoir of material to dampen or eliminate process feed fluctuations. It is also designed to carefully meter the suitably-sized pieces of wastepaper to the fiberizers at a constant and controlled rate. As previously mentioned, apparatus of this type possess the inherent characteristic that those having the finest metering abilities also have the smallest outlets and hence are more sensitive to the size of the wastepaper pieces to be metered.

Figure 2:
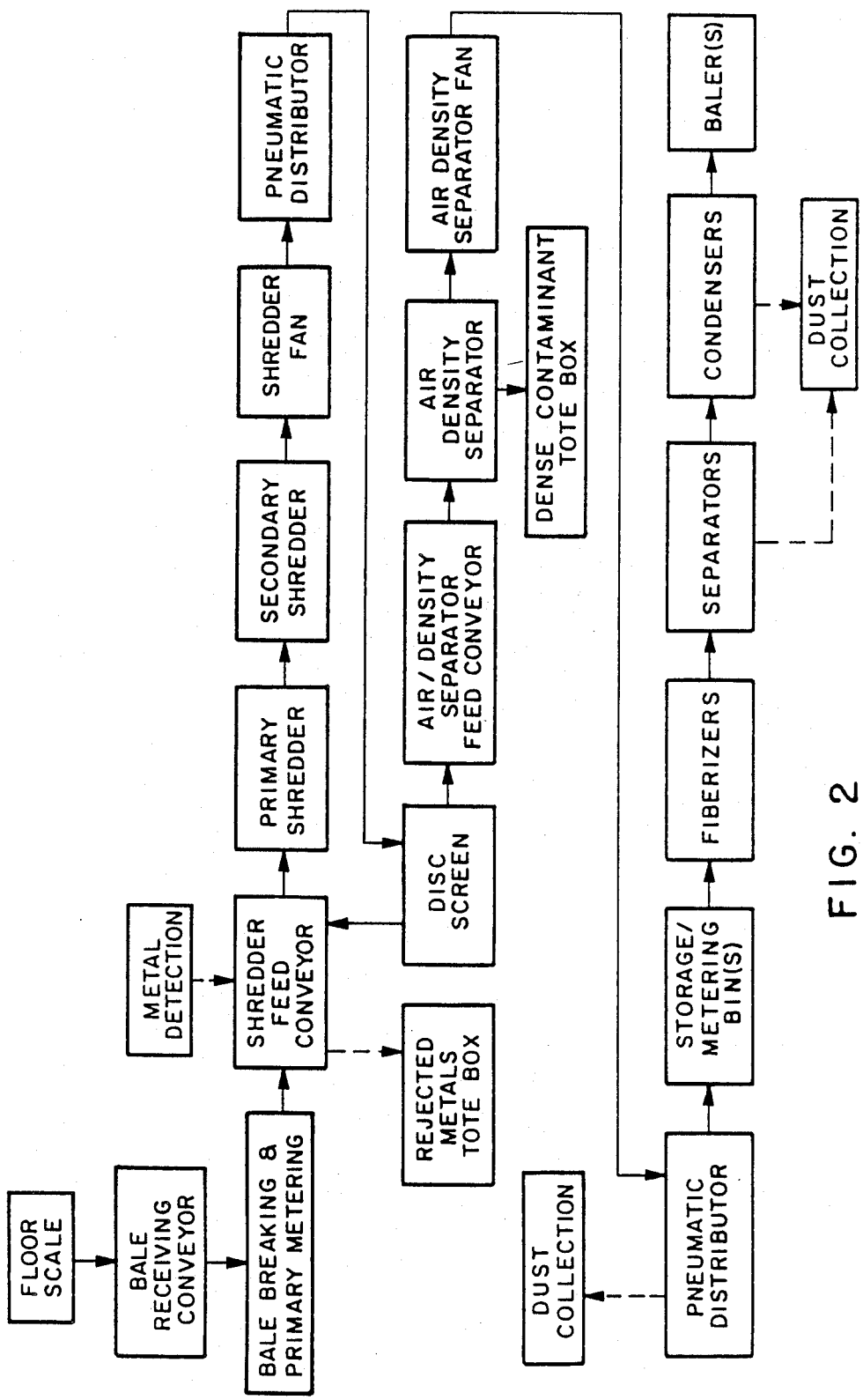
FIG. 2 is a block flow diagram of a process of this invention as applied to a dry deinking feed preparation process.

FIG. 2 illustrates a more detailed, preferred method of carrying out this invention as designed for dry deinking 100 tons of wastepaper per day. Specifically, bales of wastepaper to be deinked are weighed and placed on a bale receiving conveyor in a manner to provide the desired feed rate of material through the process. The bales are broken up by a suitable device, such as a Norba Model KS5-4 bale breaker, which also distributes the baled material onto a shredder feed conveyor. The feed material is then passed under a metal detector to remove any metal objects which might damage downstream apparatus. If a piece of metal is detected, the conveyor momentarily diverts the feed material to the reject tote box. After the flow has been diverted for a time sufficient to permit the detected metal to fall into the tote box, the conveyor redirects the feed material downstream to the primary shredder. This operation is coordinated to minimize the amount of feed material which is diverted with the metals.

After metals are removed, the feed material is preferably directed to two shredders in series: a primary shredder, which is unscreened, and a secondary shredder, which contains a screen over the outlet to limit the output to a certain maximum size. A suitable screen mesh size has an opening of about 1½-2 inches, which size is compatible with the particular storage/metering bins used in this process. The primary shredder can be, for example, a Williams XL Size 50 hammermill which serves to initially shred the feed material into a more manageable feed to the secondary shredder. The secondary shredder can be, for example, a Williams TF Size 50 screened hammermill. The secondary shredder is followed by a shredder fan which essentially pulls or draws the material through the shredders and blows or propels it downstream. Such fans are also referred to as centrifugal materials handling fans and are known commercially available equipment. As previously discussed, it has been found that the shredder fan also opens up some of the wadded-up, crumpled, balled, folded, etc. pieces of wastepaper which had previously passed through the shredder screen. This oversized material must be screened out to ensure proper operation of the particular storage/metering bin chosen.

After shredding, the shredded material is preferably airveyed to a pneumatic distributor to remove the air and dust. The shredded material, which contains opened-up pieces of wastepaper, is then deposited into a disc screen, such as a Rader Companies Model RDS-55, which separates out the oversized pieces and recycles them to the shredder feed conveyor. The suitably-sized wastepaper pieces passing through the disc screen are then deposited onto a metering conveyor and directed to an air/density separator, which is an apparatus for removing the heavier contaminants from the wastepaper by placing the material into an upwardly flowing air stream which carries the lighter pieces (paper) with the air and allows the heavier pieces (contaminants) to fall out. A specific apparatus found to be suitable, for example, is a Rader Companies air/density separator unit which is illustrated in U.S. Pat. No. 4,122,003.

The acceptable material leaving the air/density separator is then preferably passed to another pneumatic distributor to again remove air and dust. The remaining wastepaper material is dropped into an airlock and thereafter into at least one storage/metering bin. A specific storage/metering bin which is preferred is manufactured by Schenck as model Type D and is illustrated in FIG. 3. The storage/metering bin meters the wastepaper to the fiberization means and fiberization and ink removal can be achieved as described in co-pending patent application Ser. No. 554,174, filed Nov. 22, 1983.

FIG. 3 illustrates the operation of the storage/metering bin described above. As shown, the storage/metering bin comprises a housing 1 having a feed inlet 2 and an overall outlet 3. Inside the housing, the feed material is deposited onto a scraper conveyor 4 which continuously fills the bin to the rear by moving the material across the top of the stored material 5 and adding it to the slope at the rear of the bin as shown by the arrows in FIG. 3. The scraper conveyor is supported by a plate 6 at the point of the feed inlet to prevent damage to the scraper conveyor due to the momentum of the incoming feed material. The stored material 5 is supported at the bottom of the storage/metering bin by a live non-slipping bottom belt 7 which continuously carries the stored material forward to the discharge end of the storage/metering bin for discharge through a plurality of small internal outlets formed by the pick rolls 8. It is the size of these outlets that is the major source of concern referred to herein with respect to the presence of oversized pieces of wastepaper. The rate of discharge is controlled primarily by the spacing of the pick rolls and the speed of the bottom belt. However, if the pieces of the stored material become too large, there is an increasing tendency for them not to pass between the pick rolls and be internally recycled or, in extreme cases, even possibly plug the overall outlet 3. Therefore it is necessary to adequately screen the wastepaper material before it enters the storage/metering bin(s) in order to remove those pieces which are too large to pass through.

We claim:

1. A method of preparing wastepaper for fiberization comprising: (a) shredding the wastepaper in a screened shredding device, through which the wastepaper is drawn by a fan; (b) passing the resulting shredded-and-screened wastepaper through the fan, wherein wadded-up pieces of wastepaper which passed through said screen are opened up; and (c) screening out opened-up pieces of wastepaper.

2. The method of claim 1 wherein the screening out of the opened-up pieces is performed with a disc screen.

3. The process of claim 1 wherein the screened-out pieces of wastepaper are recycled to the shredding step.

4. The process of claim 1 wherein the screened shredding device is a screened hammermill.

5. In a process for deinking wastepaper wherein a wastepaper feed material is shredded to a size suitable for fiberization and fiberized substantially dry to form substantially discrete fibers and ink-containing fines which are thereafter separated, the improvement comprising:
   (a) shredding the wastepaper feed material in a screened shredding device, through which the wastepaper is drawn by a fan;
   (b) screening the shredded material after it passes through the shredder fan to remove wadded-up pieces of wastepaper which have been opened up by the fan;
   (c) depositing the screened wastepaper into at least one storage/metering bin; and
   (d) metering the screened wastepaper to one or more fiberizers.

6. The process of claim 5 wherein the shredded material is screened with a disc screen.

7. The process of claim 5 wherein the wastepaper is shredded with at least one screened hammermill.

8. The process of claim 5 wherein the opened-up pieces of wastepaper removed by the screening step are recycled to the shredding step.

9. A system for deinking wastepaper by dry fiberization of the wastepaper comprising:
   (a) a screened hammermill for shredding the wastepaper into pieces suitable for fiberization;
   (b) means for drawing the wastepaper through the screened hammermill, said means opening up wadded pieces of wastepaper and propelling the wastepaper downstream;
   (c) means for screening the wastepaper propelled downstream to remove the opened-up pieces of wastepaper and to retain the suitably-sized pieces of wastepaper;
   (d) means for metering the suitably-sized pieces of wastepaper to a fiberization means;
   (e) means for fiberizing the metered wastepaper into substantially discrete fibers and ink-containing fines; and
   (f) means for separating the fines from the fibers.

10. A system for preparing wastepaper for fiberization comprising:
   (a) a screened hammermill for shredding the wastepaper into pieces suitable for fiberization;
   (b) a shredder fan for drawing the wastepaper through the screened hammermill and propelling the resulting shredded pieces of wastepaper downstream;
   (c) a disc screen for removing opened-up pieces of wastepaper propelled downstream by the shredder fan; and
   (d) a storage/metering bin for receiving and metering pieces of wastepaper passing through the disc screen.

* * * * *